United States Patent [19]

Lee

[11] Patent Number: 4,532,528
[45] Date of Patent: Jul. 30, 1985

[54] ARCHIVAL OPTICAL STORAGE MEDIUM

[75] Inventor: Wen Y. Lee, San Jose, Calif.

[73] Assignee: International Business Machines Corporation, Armonk, N.Y.

[21] Appl. No.: 498,331

[22] Filed: May 26, 1983

[51] Int. Cl.³ ............................................ G01D 15/34
[52] U.S. Cl. .................................. 346/135.1; 430/945
[58] Field of Search ...................... 346/135.1; 430/945

[56] References Cited

U.S. PATENT DOCUMENTS

| 4,069,487 | 1/1978 | Kasai et al. | 346/76 L |
| 4,214,249 | 7/1980 | Kasai et al. | 346/76 L |
| 4,268,575 | 5/1981 | Shinozaki et al. | 428/336 |
| 4,385,305 | 5/1983 | Terao et al. | 346/135.1 |
| 4,400,707 | 8/1983 | Mitsuya et al. | 346/135.1 |

Primary Examiner—E. A. Goldberg
Assistant Examiner—Gerald E. Preston
Attorney, Agent, or Firm—Joseph G. Walsh

[57] ABSTRACT

A recording medium comprising a transport substrate, a tellurium recording layer and an overcoat of selenium from 5 to 60Å thick.

5 Claims, 1 Drawing Figure

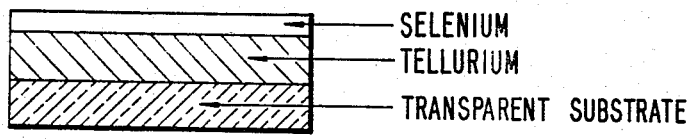

ARCHIVAL OPTICAL STORAGE MEDIUM

DESCRIPTION

1. Technical Field

The present invention is concerned with an archival optical storage medium.

2. Background Art

Recording media for recording a laser beam bearing information by deformation of a recording layer are well known in the art. They are shown for example, in U.S. Pat. No. 4,069,487. That patent also shows the use of a protective layer for the recording layer. In the patent, the protective layer and the recording layer are both of materials different from those of the present invention, and the protective layer is much thicker than that of the present invention.

The use of a layer of tellurium as a recording layer is shown in U.S. Pat. No. 4,214,249. The patent does not teach the use of a protective layer.

U.S. Pat. No. 4,268,575 shows the use of a recording layer which may be tellurium, among a very large number of other things. A protective layer, which is a polymer, is also shown, but the use of a protective layer like that of the present invention is not suggested.

DISCLOSURE OF THE INVENTION

According to the present invention, an archival optical storage medium is comprised of a transparent substrate, a layer of tellurium on top of said substrate, and on top of said layer of tellurium, a layer of selenium from 5 to 60 Å thick.

The substrate may be of any material conventionally used in the present type of recording medium. It may, for example, be glass, or polymer such as polycarbonate, poly(methylmethacrylate), or polyethylene terephthalate.

The layer of tellurium is from 100 to 500 Å thick, most preferably from about 200 to 300 Å thick.

It is a critical feature of the present invention that the tellurium layer is overcoated with a selenium layer which is from 5 to 60 Å thick. When a selenium overcoat of such thickness is used, the laser writing sensitivity of the system is not decreased, and the archival storage stability is greatly increased. When the Se layer is less than 5 Å thick, it is not effective to increase archival stability, and most surprisingly, when the Se layer is thicker than 60 Å, archival stability is actually decreased. The explanation for this observed fact is not known. The most preferred thickness for the Se layer is from 20 to 40 Å.

In one preferred variation of the present invention, instead of a layer of tellurium, a layer of 95% tellurium and 5% by weight selenium is used as the recording layer. When overcoated with Se, this composition is even more stable than the pure tellurium layer.

DESCRIPTION OF THE DRAWING

The drawing is a cut-away, side view of an embodiment of the present invention. It is not to scale.

The Te and Se films useful in the present invention can be thermally evaporated onto glass or polymethyl methacrylate (PMMA) substrates from pure Te (99.9995%) and Se (99.95%) source material. During the film deposition, the substrate is nominally at room temperature and the pressure in the vacuum chamber is typically about $1 \times 10^{-7}$ Torr. The Te film thickness (200 and 300 Å) and deposition rate (10, 125 and 300 Å/min) are controlled by quartz crystal monitors. Se is evaporated at a rate of about 1 Å/sec right after the Te deposition. For Te-Se alloy films, Te and Se are codeposited using appropriate deposition rates to obtain films with desired compositions.

These films were lifetime tested either in room air, or in an accelerated environmental chamber maintained nominally at 95% RH/65° C. Some of these films were also tested in a 47° C. water bath. The average transmission using an unfiltered tungsten light or He-Ne laser was monitored in situ as a function of exposure (or submersion) time to study the degradation of these films. An uncoated glass or PMMA substrate was used to normalize the light transmission measurement and hence minimize the effect of intensity fluctuation of the light source. The reproducibility of each transmission measurement was typically 0.5%.

The transmission (T) was measured as a function of air-exposure time for 200 Å Te films deposited at 10, 125 and 300 Å/min, and for a 200 Å Te film deposited at 125 Å/min and overcoated with 40 Å Se. For pure Te films, the T change rate ($\Delta T/\Delta t$) increased with decreasing deposition rate. For example, after one year air exposure T increased by about 30, 60 and 90% of the initial value for films deposited at 300, 125 and 10 Å/min, respectively. On the other hand, the Se-overcoated Te film showed no measurable T change ($\Delta T$) even after 30 month exposure in the room air. Similar beneficial effect of Se overcoat was also observed when these films were tested under more accelerated conditions (95% RH at 65° C.). Under these conditions, the average $\Delta T/\Delta t$ was found to be at least a factor of 10 to 20 smaller for the Se-overcoated samples. Since the acceleration factor for Te films tested at 95% RH/65° C. was estimated to be about 100-150, the ultra thin Se overcoat increases the life time of a pure Te film by more than 3 orders of magnitude.

In order to determine the optimum Se overcoat thickness, 200 Å thick Te films (deposited at 300 Å/min) overcoated with 5-120 Å Se were made and tested in the accelerated environment along with a similar uncoated Te film. Even a 5 Å Se overcoat has significantly slowed down the $\Delta T/\Delta t$, the optimum thickness being about 20-40 Å. The films overcoated with more than 60 Å Se were found to degrade slightly faster than for those overcoated with 20-40 Å Se.

Some of these films were also tested in a 40° C. water bath. Pure Te films tended to peel off from the substrate rapidly (<1 minute) when submerging in this bath. The film peeling rate as monitored in situ by the change in light transmission (from a He-Ne laser) as a function of submersion time. The incubation period required for rapid film peeling to occur increased markedly with the presence of Se overcoat. For films with 10-40 Å Se overcoat, about 3 orders of magnitude longer time was needed to show the same amount of film peeling as the pure Te film. However, for the film overcoated with 120 Å Se, the effect is somewhat degraded compared to those overcoated with 10-40 Å Se. The reason for this behavior is not understood.

I claim:

1. An archival optical storage medium comprising a transparent substrate, a layer of tellurium on top of said substrate, and on top of said layer of tellurium, a layer consisting essentially of selenium from 5 to 60 Å thick.

2. A medium as claimed in claim 1 wherein the tellurium layer is from 200 to 300 Å thick.

3. A medium as claimed in claim 1 wherein the selenium layer is 20 to 40 Å thick.

4. A medium as claimed in claim 1 wherein the tellurium layer contains about 5% by weight selenium.

5. An archival optical storage medium comprising a transparent substrate, a layer 200 to 300 Å thick of 95% tellurium and 5% selenium on top of said substrate, and an overcoating layer of selenium from 20 to 40 Å thick.

* * * * *